United States Patent [19]
Snyder

[11] 3,724,789
[45] Apr. 3, 1973

[54] RAM AIR GLIDE PARACHUTE

[76] Inventor: Stephen L. Snyder, 331 Cherry Hill Boulevard, Cherry Hill, N.J. 08034

[22] Filed: Feb. 2, 1970

[21] Appl. No.: 7,687

[52] U.S. Cl. ................................................244/145
[51] Int. Cl. ............................................B64d 17/20
[58] Field of Search...........244/145, 146, 152, 153, 244/138 R, 142

[56] References Cited

UNITED STATES PATENTS

| 3,524,613 | 8/1970 | Reuter et al. | 244/142 |
| R26,427 | 7/1968 | Jalbert | 244/145 X |
| 3,228,635 | 1/1966 | Hughes et al. | 244/145 |
| 3,199,814 | 8/1965 | Frieder | 244/145 |
| 3,428,277 | 2/1969 | Everett | 244/146 X |
| 2,365,184 | 12/1944 | Frieder et al. | 244/145 |

Primary Examiner—Trygve M. Blix
Assistant Examiner—Carl A. Rutledge
Attorney—Clarence A. O'Brien and Harvey B. Jacobson

[57] ABSTRACT

An airfoil-shaped parachute having airflow channels formed below a top flexible canopy between ribs extending from the leading edge of the canopy toward its trailing edge. Suspension lines are secured to the lower edges of the ribs for supporting a payload. The airflow through the channels and the distribution of stress applied from the suspension lines, maintains the airfoil shape of the inflated parachute to sustain a controlled glide path for the payload.

16 Claims, 9 Drawing Figures

PATENTED APR 3 1973

Stephen L. Snyder
INVENTOR.

BY Clarence A. O'Brien
and Harvey B. Jacobson
Attorneys

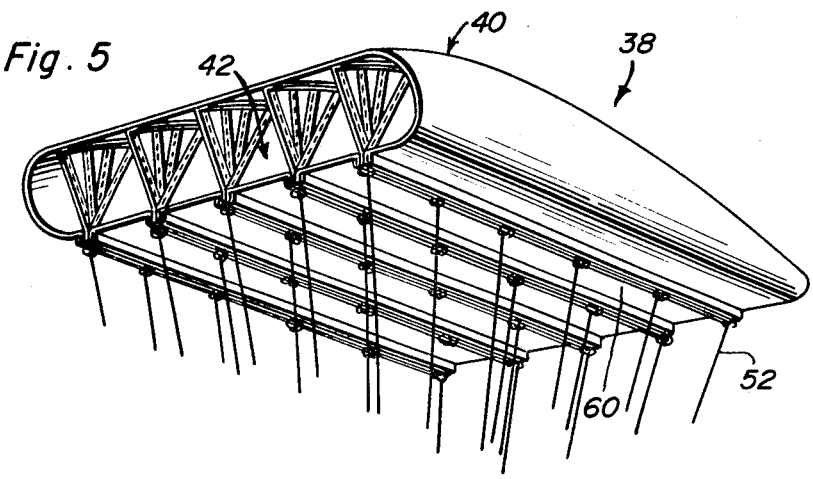
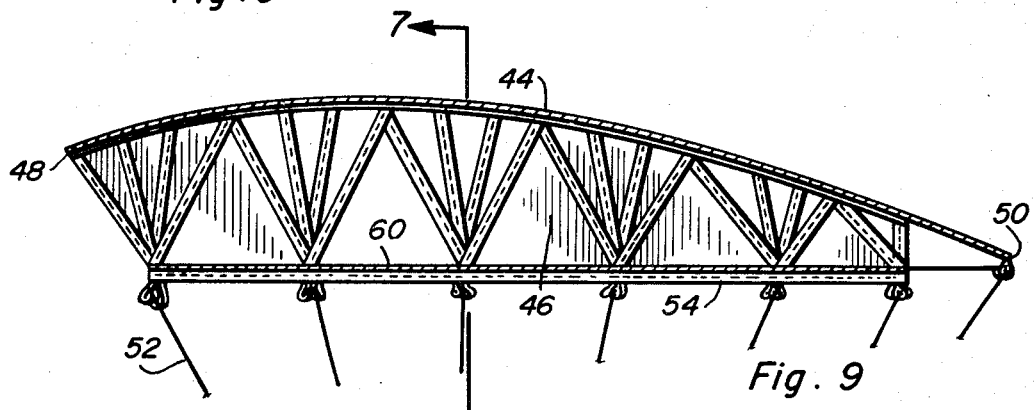
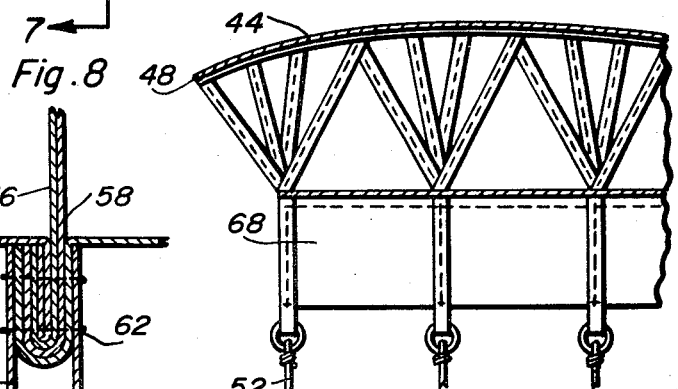
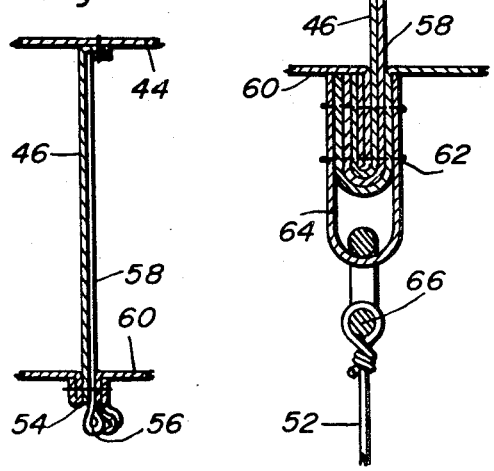
Stephen L. Snyder
INVENTOR.

3,724,789

RAM AIR GLIDE PARACHUTE

This invention relates to flexible airfoil types of parachutes from which payloads are suspended in the atmosphere, and wherein the airfoil shape of the parachute is sustained by channeled flow of air in a generally horizontally direction through the parachute canopy.

Multi-airflow channel types of airfoil shaped parachutes are receiving increased attention because of glide path stabilization and controllability characteristics making them useful for recovery of payloads, towing of aerial targets, etc. Parachutes of this type are disclosed for example in U.S. Pat. No. 26,427 to Jalbert, but have serious drawbacks avoided by the parachute disclosed and claimed herein.

The present invention resides in improvements in parachutes of the foregoing type and more particularly in the provision of a parachute of reduced bulk and increased over-all glide efficiency. This is achieved by eliminating the wedge attachments to as well as the continuous bottom sheet as disclosed and claimed in the aforementioned Jalbert patent resulting in a reduction in aerodynamic drag with the additional benefit of reducing manufacturing costs.

In accordance with the present invention, a multi-airflow channeled type of airfoil parachute is formed with a top canopy skin from which flexible ribs or dividers depend to form the airflow channels therebetween. The suspension lines are secured directly to the ribs along the lower edges thereof and the stresses applied to the ribs by the payload suspended from the suspended lines, are distributed by means of reinforcing tapes secured to the ribs. The suspension lines are accordingly anchored to loop formations along the lower edges of the ribs. In one form of the invention, the ribs form triangular airflow channels so as to eliminate the need for any bottom sheet. In another form of the invention, separate bottom sheet sections space the lower edges of the ribs and are secured thereto at the locations from which the loop formations depend.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a perspective view showing another form of parachute constructed in accordance with the present invention.

FIG. 6 is a side sectional view through the parachute illustrated in FIG. 5.

FIG. 7 is a partial transverse sectional view taken substantially through a plane indicated by section line 7—7 in FIG. 6.

FIG. 8 is a partial sectional view showing a modification of the arrangement illustrated in FIG. 7.

FIG. 9 is a partial side sectional view showing a modification of the arrangement illustrated in FIG. 6.

Figure 1:
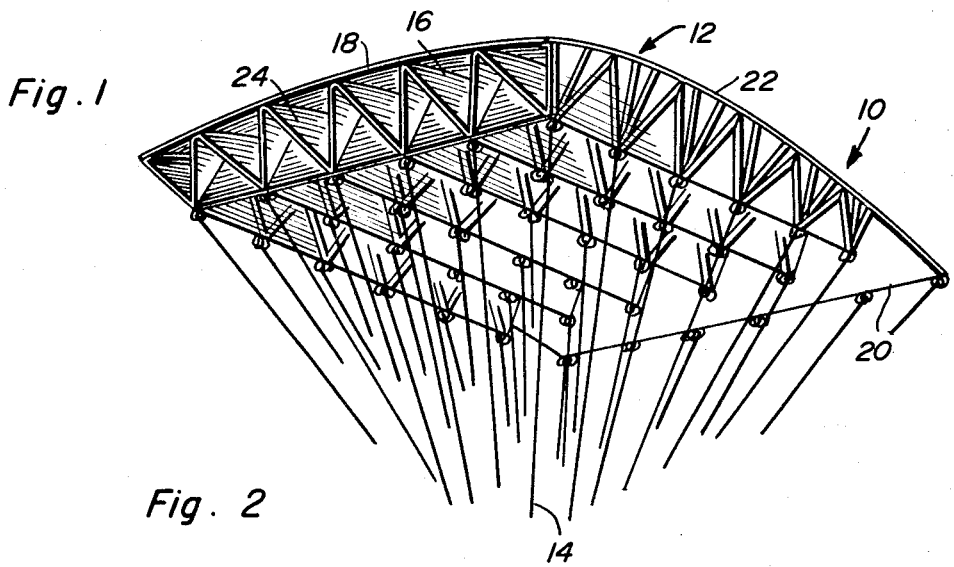
FIG. 1 is a perspective view showing one form of a parachute constructed in accordance with the present invention.

Referring now to the drawings in detail, FIG. 1 illustrates a flexible airfoil parachute generally referred to by reference numeral 10 which includes an airfoil shaped canopy generally denoted by reference numeral 12 to which a plurality of suspension lines 14 are secured. The parachute canopy 12 has an airfoil shape when inflated as illustrated in FIG. 1 so that a payload (not shown) connected to the lower ends of the suspension lines 14, will be suspended in the atmosphere for flight along a controlled glide path over a substantially long horizontal distance because of the aerodynamic lift forces exerted on the parachute canopy. The airfoil shape of the parachute canopy is sustained because of the ram effect of the airflow through a plurality of channels 16 that extend longitudinally through the parachute canopy from its leading edge 18 toward its trailing edge 20.

Figure 2:
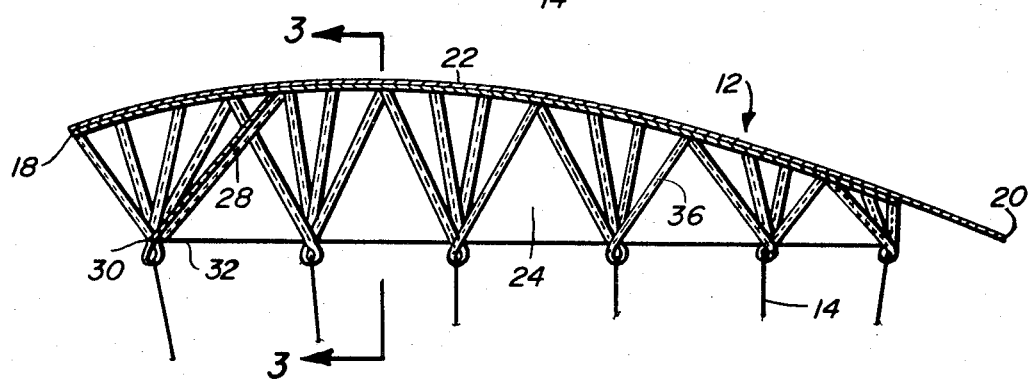
FIG. 2 is a side sectional view through the parachute illustrated in FIG. 1.
Figure 3:
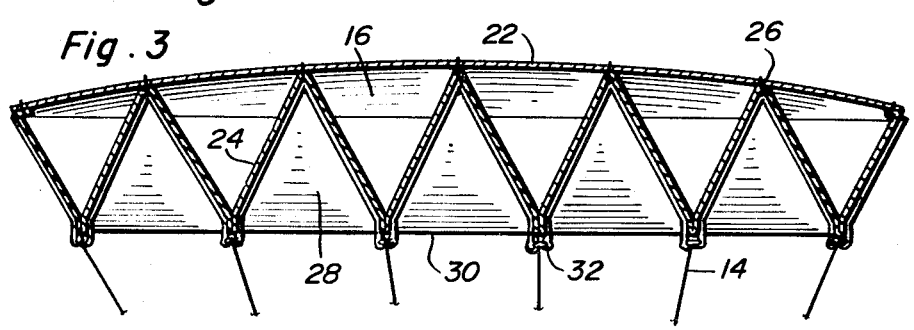
FIG. 3 is a transverse sectional view taken substantially through a plane indicated by section line 3—3 in FIG. 2.

In the form of the invention illustrated in FIGS. 1–3, the airflow channels 16 are triangular in cross-sectional flow area and are formed below a top flexible skin 22 made of the usual parachute canopy fabric. The channels are formed between flexible fabric ribs or dividers 24 that are secured to and depend from the top skin 22. The ribs 24 may be formed from a folded sheet of fabric to which the top skin 22 is secured along laterally spaced locations 26 as more clearly seen in FIG. 3. The ribs 24 are so dimensioned as to provide the lateral curvature for the top skin 22 in the inflated condition of the parachute as well as the longitudinal airfoil curvature between the leading and trailing edges 18 and 20. Further, the rib panels 24 may be terminated short of the trailing edge 20 as shown if desired. Also, in order to maintain the triangular shape of the channels 16, triangular stiffening panels 28 are secured to adjacent ribs 24 so that the bases 30 of the triangular stiffening panels space the lower interconnected or folded edges 32 of the ribs 24 at the leading edge portion of the parachute canopy. The stiffening panels 28 also extend rearwardly from the lower edges 32 at the leading edge portion of the canopy as more clearly seen in FIG. 2 toward the upper skin 22. The rearward angle of the stiffening panels 28 and the distance at which it intersects the top skin from the leading edge 18 will vary in accordance with the requirements of the parachute.

Figure 4:
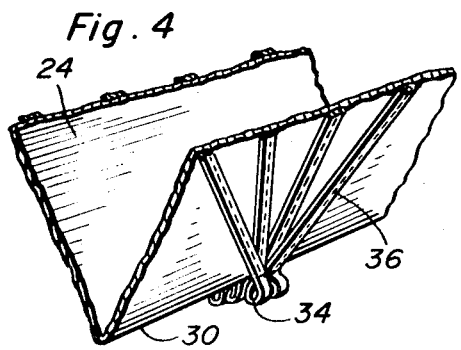
FIG. 4 is a partial perspective view showing a portion of the parachute illustrated in FIGS. 1-3.

Unlike the arrangement disclosed in the Jalbert patent aforementioned, the load suspension lines 14 are secured directly to the lower edges 32 of some or all of the rib panels 24 by means of loop extensions 34 of downwardly converging reinforcing tapes 36 that are secured as by stitching to the ribs 24. The reinforcing tapes thus diverge from the lower edges 30 of the ribs upwardly toward the upper skin 22 as more clearly seen in FIGS. 2 and 4 to thereby distribute the stresses applied to the ribs from the suspension lines 14. This method of distributing stress makes for a more economical parachute construction by eliminating the use of textile wedges to which the suspension lines are secured as disclosed in the Jalbert patent aforementioned and furthermore stiffens the ribs to maintain the channeled flow of air through the parachute.

FIGS. 5 and 6 illustrate a second form of parachute constructed in accordance with the present invention and generally denoted by reference numeral 38 having an airfoil shaped canopy 40 through which air channels 42 extend, the air channels being generally rectangular in crossnsectional flow area. The canopy 40 is formed by a top flexible skin 44 to which a plurality or parallel spaced ribs 46 are secured along the chordal length of the airfoil shaped canopy between the leading edge 48 and the trailing edge 50. As in the case of the parachute 10, load suspension lines 52 are secured to the canopy along the lower edges 54 of the ribs. Also as in the case of the parachute 10, the suspension lines are secured to the lower edges of the ribs by means of loop extensions 56 at the lower ends of reinforcing tapes 58 secured to the ribs and diverging upwardly from the lower edges toward the upper skin 44 so as to distribute stress. The air channels 42 which are formed between the ribs 46, are closed along the bottom of the canopy by separate bottom sheet sections 60 which are secured to the lower edge portions of the ribs together with the loop extensions 56 as more clearly seen in FIG. 7.

As an alternative method of attaching the suspension lines, the adjacent edge portions of the bottom sheets may be folded with the associated rib 46 and tapes 58 at each location along the bottom edge and secured by stitching 62 to a fabric loop 64 as shown in FIG. 8. The suspension line 52 is secured to the loop 64 by a ring 66.

Another modification is shown in FIG. 9, wherein an elongated fabric web 68 interconnects the suspension lines 52 along the bottom edges of the ribs to space the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an aerial device having an inflated airfoil shape formed by a top flexible skin from which spaced ribs depend to define airflow channels extending from a leading edge portion of the top skin toward a trailing edge portion thereof, means for suspending a payload from the aerial device, through a plurality of suspension lines, comprising anchoring means for connecting the suspension lines to at least some of the ribs and stress distributing means mounted on the ribs between the anchoring means and the top skin for transferring the tension in said suspension lines directly to spaced locations on the top flexible skin.

2. The combination of claim 1 wherein said stress distributing means comprises a plurality of reinforcing tapes secured to the ribs and extending in diverging relation to each other from the anchoring means toward the top flexible skin.

3. The combination of claim 1 wherein said anchoring means is spaced throughout from the top flexible skin and the stress distributing means is located within said airflow channels.

4. In combination with an aerial device having an inflated airfoil shape formed by a top flexible skin from which spaced ribs depend to define airflow channels extending from a leading edge portion of the top skin toward a trailing edge portion thereof, means for suspending a payload from the aerial device, through a plurality of suspension lines, comprising anchoring means for connecting the suspension lines to at least some of the ribs and stress distributing means mounted on the ribs between the anchoring means and the top skin for transferring the tension in said suspension lines directly to spaced locations on the top flexible skin, said anchoring means comprising loop extensions of said stress distributing means to which the suspension lines are secured adjacent lower edges of the ribs.

5. The combination of claim 4 wherein said stress distributing means comprises a plurality of reinforcing tapes secured to the ribs and extending in diverging relation to each other from the anchoring means toward the top flexible skin.

6. The combination of claim 5 wherein adjacent ones of said ribs are secured to each other along the lower edges thereof to form substantially triangular airflow channels.

7. The combination of claim 6 including stiffening panels secured to adjacent ones of the ribs between the airflow channels and extending rearwardly from the lower edges of the ribs towards the top flexible skin.

8. The combination of claim 4 wherein adjacent ones of said ribs are secured to each other along the lower edges thereof to form substantially triangular airflow channels.

9. The combination of claim 8 including stiffening panels secured to adjacent ones of the ribs between the airflow channels and extending rearwardly from the lower edges of the ribs towards the top flexible skin.

10. The combination of claim 4 including stiffening panels secured to adjacent ones of the ribs between the airflow channels and extending rearwardly from the lower edges of the ribs towards the top flexible skin.

11. The combination of claim 4 wherein said ribs are secured to the top flexible skin in spaced relation to each other and bottom sections interconnected between the ribs adjacent the lower edges thereof.

12. The combination of claim 11 wherein said stress distributing means comprises a plurality of reinforcing tapes secured to the ribs and extending in diverging relation to each other from the anchoring means toward the top flexible skin.

13. The combination of claim 11 wherein said anchoring means includes fabric loops secured to edge portions of adjacent bottom sections folded over with associated ribs and the stress distributing means, said suspension lines being connected to the loops closely spaced below the lower edges of the ribs.

14. In combination with an aerial device having an inflated airfoil shape formed by a top flexible skin from which spaced ribs depend to define airflow channels extending from a leading edge portion of the top skin toward a trailing edge portion thereof, means for suspending a payload from the aerial device, through a plurality of suspension lines, comprising anchoring means for connecting the suspension lines directly to at least some of the ribs along lower edges thereof, separate bottom sections interconnected between the ribs adjacent the lower edges, and spacing webs interconnecting the suspension lines along said lower edges of the ribs.

15. In combination with an aerial device having an inflated airfoil shape formed by a top flexible skin from which spaced ribs depend to define airflow channels extending from a leading edge portion of the top skin toward a trailing edge portion thereof, means for suspending a payload from the aerial device, through a plurality of suspension lines, comprising anchoring means for connecting the suspension lines directly to at least some of the ribs along lower edges thereof, separate bottom sections interconnected between the ribs adjacent the lower edges, said anchoring means including fabric loops secured to edge portions of adjacent bottom sections folded over with associated ribs, said suspension lines being connected to the loops closely spaced below the lower edges of the ribs.

16. In combination with an aerial device having an inflated airfoil shape formed by a top flexible skin from which spaced ribs depend to define airflow channels extending from a leading edge portion of the top skin toward a trailing edge portion thereof, means for suspending a payload from the aerial device, through a plurality of suspension lines, comprising anchoring means for connecting the suspension lines to at least some of the ribs, stress distributing means mounted on the ribs between the anchoring means and the top skin for transferring the tension in said suspension lines directly to spaced locations on the top flexible skin, and spacing webs interconnecting the suspension lines along lower edges of the ribs.

* * * * *